Feb. 18, 1964  E. D. HARTLEY  3,121,399
FLUID HANDLING DEVICE
Filed Oct. 31, 1960  3 Sheets-Sheet 1
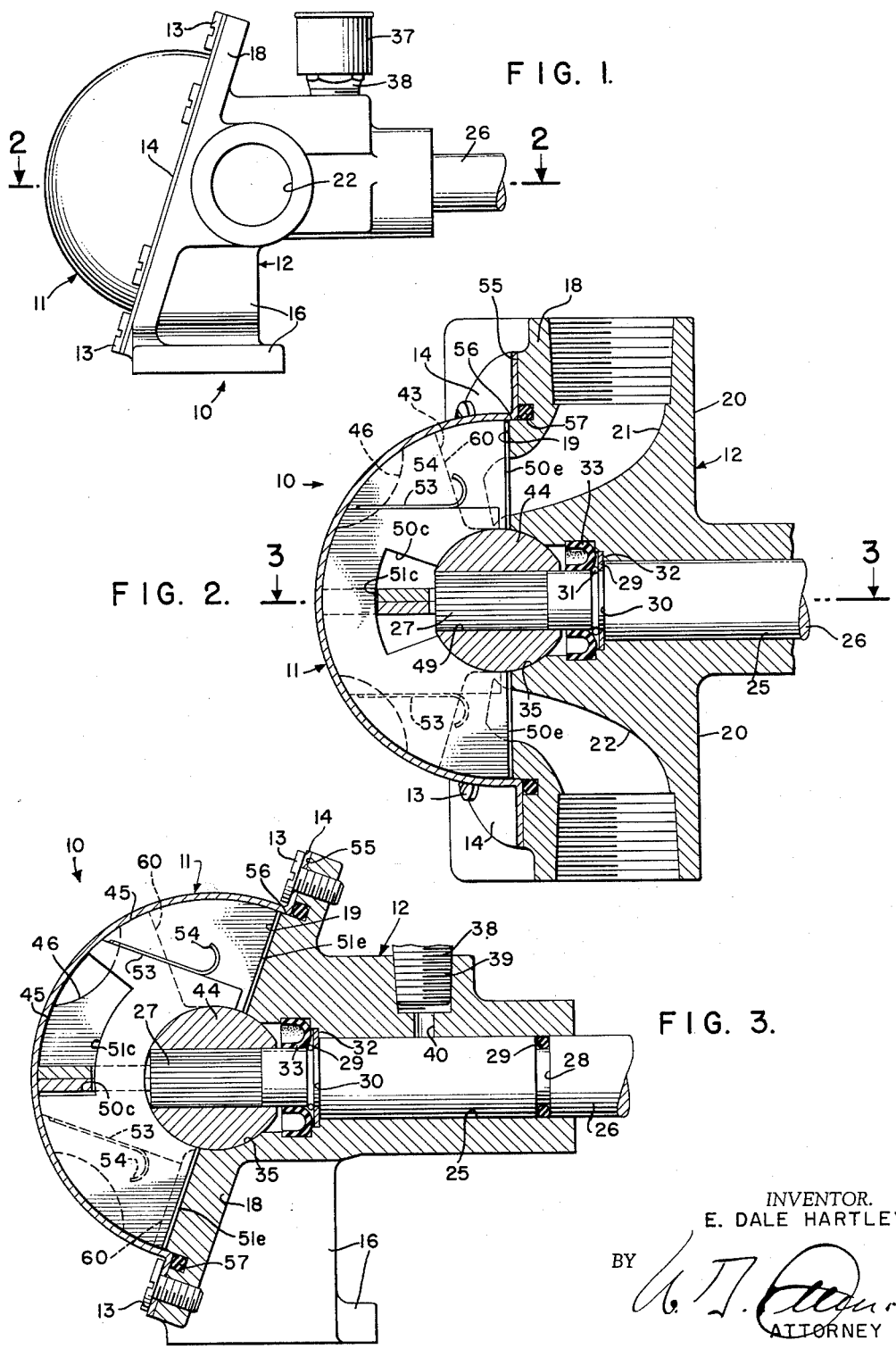
INVENTOR.
E. DALE HARTLEY
BY 
ATTORNEY Feb. 18, 1964  E. D. HARTLEY  3,121,399
FLUID HANDLING DEVICE
Filed Oct. 31, 1960  3 Sheets-Sheet 2
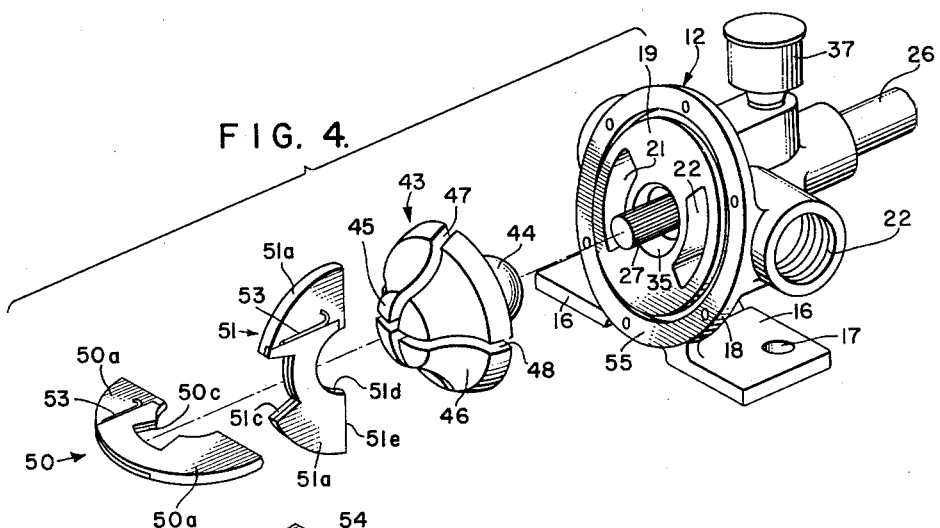
FIG. 4.
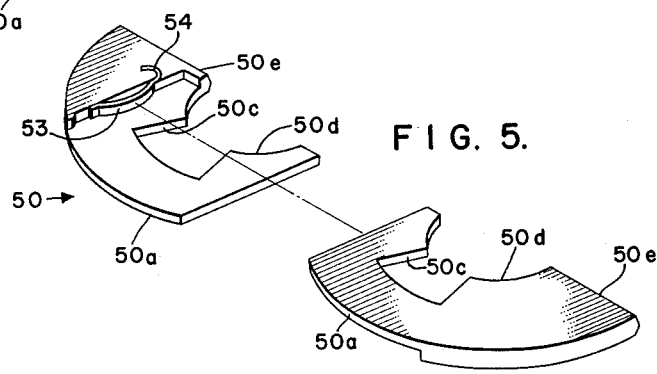
FIG. 5.
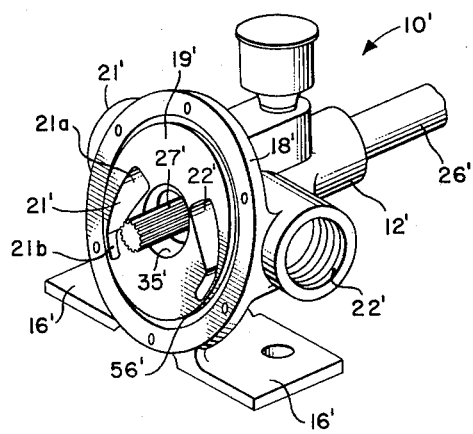
FIG. 6.
INVENTOR.
E. DALE HARTLEY
BY 
ATTORNEY Feb. 18, 1964     E. D. HARTLEY     3,121,399
FLUID HANDLING DEVICE
Filed Oct. 31, 1960     3 Sheets-Sheet 3
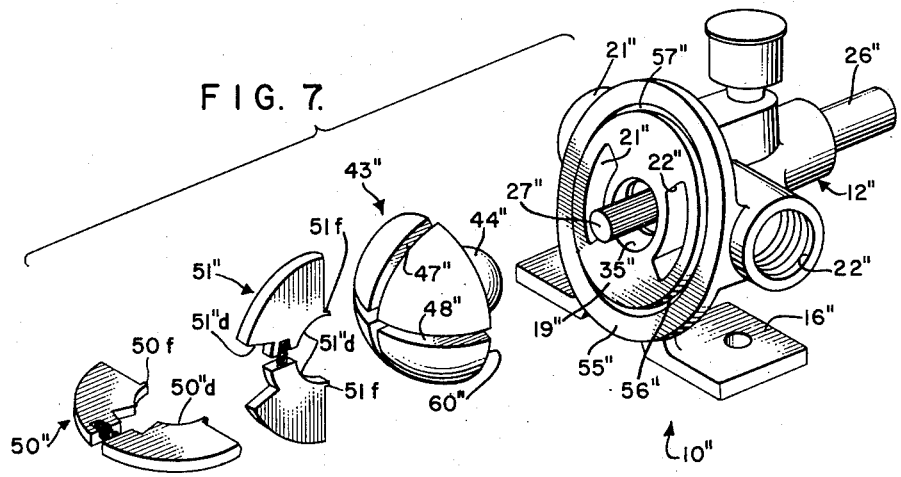
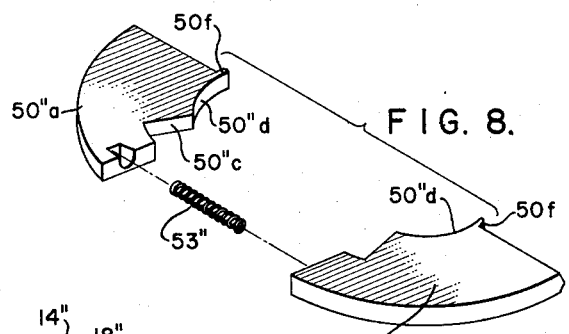
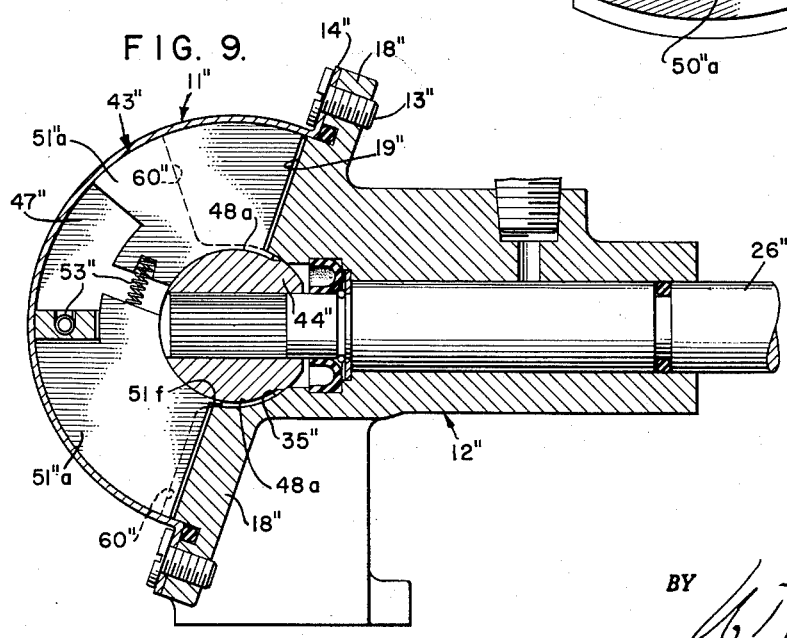
INVENTOR.
E. DALE HARTLEY
BY
ATTORNEY

United States Patent Office 3,121,399
Patented Feb. 18, 1964

3,121,399
FLUID HANDLING DEVICE
E. Dale Hartley, 2700 Jalmia Drive,
Los Angeles 46, Calif.
Filed Oct. 31, 1960, Ser. No. 66,215
7 Claims. (Cl. 103—142)

This invention relates to fluid handling devices and more particularly to an improved lightweight compact high-efficiency assembly characterized by a single semi-spherical fluid handling cavity having supported therein a rotor and multiple vane assembly arranged to be driven by a shaft extending into the cavity through a spherical socket in the flat end wall of the cavity.

Typical embodiments incorporating the principles of the invention are related to the fluid handling device disclosed in my co-pending application for United States Letters Patent Serial No. 746,895, filed July 7, 1958, but exhibit numerous advantages and improvements over this earlier disclosure. One of the principal structural differences resides in the fact that the rotor-vane assembly of the earlier design is driven by a shaft extending through a spherical area of the casing, whereas in the present invention the rotor-vane assembly is driven through the flat end wall of the fluid displacement cavity. This difference provides the basis for notable simplifications in design and in manufacturing tolerance problems and exhibits numerous other highly desirable advantages.

For example, one of the features of the present design is that the main body of the device is formed as a unitary casting having provision for supporting the driving shaft and the rotor assembly, for supporting the unit from the mounting surface and additionally incorporating the inlet and outlet fluid passages. All major tolerance surfaces are formed in or gauged from high tolerance surfaces present on this single main casting. Furthermore, and of considerable significance, the remaining components of the assembly include a semi-spherical casing easily and economically formed by any of several inexpensive metal forming techniques from thin sheet stock, including either metallic or non-metallic material. Enclosed by this one-piece spherical casing is a unitary rotor-vane assembly readily and detachably connectable with the main drive shaft, the inner end of which projects into or closely adjacent the fluid displacement cavity. In consequence, servicing of this assembly is accomplished simply by removing the spherical casing and withdrawing the assembly from the end of the drive shaft. Replacement and reassembly of the parts is accomplished equally expeditiously.

Among the other features and advantages is the fact that the rotor-vane assembly includes a spherical hub seating in a spherical socket formed centrally of the end wall of the main body casting. The remaining portions of the rotor are formed with a pair of transverse slots arranged at right angles to one another and seating therewithin two sets of vane parts each set of which includes a plurality of parts urged into sealing engagement with the cavity walls by centrifugal action and preferably supplemented by the resilient action of small springs carried by the vane parts themselves.

The rotor slots include groove extensions formed in the spherical hub and the side walls of which have a close sliding fit with the adjacent inner edges of the vane parts. Additionally, a short extension on the inner edge of the parts projects into and beyond and flat surfaced end walls of the main body to assure positive sealing action between quadrants of the fluid displacement chambers. By reason of the described structural features of the rotor-vane assembly it will be understood that the parts of the vane sets are free to move as necessary to accommodate the device to wear, differential expansion, manufacturing tolerance variations of the parts and the like factors to an extent never achieved heretofore in a device of this type.

Another feature of special import is the supporting of the device in such a manner as to obtain maximum flow with minimum losses and minimum wear of the parts. In all instances the fluid flow ports are of maximum area and are confined to diametrically opposed quadrants with each port having a circumferential length substantially equal to but not in excess of 90 degrees. For maximum efficiency and effectivenes in handling fluid having entrained therewith solids or semi-solids, the fluid ports are preferably of special design and having a characteristic dog-leg shape at the point of merger with a fluid handling cavity. One end portion of the ports is of larger cross-section than the other and located close to the center of the cavity whereas the other and smaller area end is disposed close to the outer periphery of the cavity. In both instances, however, the edge of the port is preferably disposed inwardly of the ends of the radial edge of the vane to the end that these surfaces may provide adequate bearing support with the edges of the vanes in contact therewith.

The described arrangement and design of the dog-leg porting provides a maximum area for the low-velocity inflowing fluid in an area so disposed relative to the advancing vanes that these vanes will be rendered highly effective in throwing incoming liquid into the outermost portions of the action quadrant. Likewise, the disposition of the smaller area end of the port close to the periphery results in the high-velocity flow of fluid discharging from the displacement cavity with increased ability to entrain therewith heavier solid or semi-solid particles to transport these out of the cavity with minimum liability for fouling or injury to the device parts.

Accordingly, it is a primary object of this invention to provide a new inexpensive, simply constructed, rugged, high-efficiency fluid handling device of the positive displacement type readily adapted for use as a motor, pump, compressor, meter or the like applications.

Another object of the invention is the provision of an improved fluid handling device utilizing a semi-spherical displacement cavity supporting therewithin a rotor-vane assembly arranged to be driven by a shaft projecting into the displacement chamber through the flat end wall thereof.

Another object of the invention is the provision of a fluid handling device featuring a rotor-vane assembly wherein the rotor has a spherical surface hub socketed in a complementally shaped recess of the displacement chamber end wall and a larger diameter semi-spherical surface having a close running fit with juxtaposed spherical surfaces of the cavity wall.

Another object of the invention is the provision of a positive displacement fluid handling unit having a flat circular end wall recessed to seat the rim edge of a thin-walled spherical-surfaced casing with all parts thereof concentric with the focal center of a semi-spherical displacement chamber.

Another object of the invention is the provision of an improved rotor-vane assembly for a semi-spherical displacement chamber having two sets of vanes arranged at right angles to one another with the vanes of each set identical in shape and size and urged away from one another by centrifugal action supplemented by spring action.

Another object of the invention is the provision of fluid displacement device having a semi-spherical displacement chamber and wherein substantially all critical surfaces are concentric with the focal center of the semi-spherical displacement chamber.

Another object of the invention is the provision of a fluid pump having a one-piece main body having a driving shaft journaled therein and intersecting a circular flat end wall surface at the center thereof, said shaft separably supporting and driving the semi-spherical rotor-vane assembly held assembled to said shaft by a thin-walled semi-spherical casing.

Another object of the invention is the provision of fluid displacement rotor assembly having a pair of radial slots supporting therein two sets of vane parts to which access is readily had for servicing by removal of a semi-spherical casing and the cavity contacting surfaces of which are urged constantly in contact with such cavity surfaces to maintain a seal therewith by centrifugal and spring action acting in concert with one another.

Another object of the invention is the provision of a simple, rugged, high-efficiency fluid displacement device equally effective when operated in either rotary direction and featuring fluid inlet and outlet ports restricted to quadrants of the displacement chamber in diametric opposition to one another.

These and other more specific objects will appear upon reading the following specification and claims and upon considering in connection therewith the attached drawings to which they relate.

Referring now to the drawings in which preferred embodiments of the invention are illustrated:

FIGURE 1 is a side elevational view of one preferred embodiment of the invention;

FIGURE 2 is a horizontal transverse sectional view taken along line 2—2 on FIGURE 1;

FIGURE 3 is a vertical longitudinal sectional view taken along line 3—3 on FIGURE 2;

FIGURE 4 is a longitudinal exploded view of the parts except for the casing;

FIGURE 5 is an exploded perspective view of the identical parts of one set of vanes;

FIGURE 6 is a perspective view of the main body casting similar to that shown in FIGURE 4 but differing with respect to the fluid inlet and outlet ports;

FIGURE 7 is an exploded view in perspective of an alternate embodiment of the invention differing from the first embodiment primarily in the design of the rotor assembly;

FIGURE 8 is an exploded perspective view of one set of vanes; and

FIGURE 9 is a vertical longitudinal sectional view through the assembled device illustrated in FIGURE 7.

Referring first more particularly to FIGURES 1 to 5, there is shown one preferred embodiment of a fluid handling device embodying the present invention and designated generally 10. The externally visible portion of this device includes a semi-spherical casing 11 and a one-piece main body casting 12 held assembled in fluid-tight relation by cap screws 13 extending through holes in the flanged rim 14 of casing 11.

Main body 12 may be formed from any suitable rigid material and is most economically formed by conventional casting technique. Desirably the main body is formed of brass, brass alloy, bronze or the like, since this avoids the need for bearing sleeves or other suitable bearing means for the drive shaft. The main body includes a pedestal 16 provided with holes 17 to facilitate anchoring the base to a support. Integral with the base pedestal is an end wall 18 of circular configuration having a flat surface 19 forming part of a semi-spherical fluid displacement cavity.

As is best shown in FIGURE 2, the lateral sides of main body 12 include diametrically aligned bosses 20, 20 each formed with an elbow-shaped large area fluid passage 21, 22 each terminating in large area fluid ports opening into the fluid displacement cavity through surface 19. It is pointed out and emphasized that these ports have an arcuate length along surface 19 of approximately 90 degrees and occupy diametrically opposed quadrants of this surface spaced diametrically to either side of the center line of the device. The reason and advantages of this arrangement will become more apparent below in connection with a discussion of the rotor-vane assembly and the operation of the device.

Main body 12 is provided with a horizontally disposed shaft supporting bore 25 supporting a driving shaft 26. This shaft has a reduced inner end of non-circular configuration, such as splines 27, detachably receiving and supporting the rotor assembly. Shaft 26 preferably includes a groove 28 seating therein an O-ring or the like fluid seal of material immune to attack by lubricants. The shaft may be held against withdrawal from bore 25 by a washer 29 held pressed against shoulder 30 of the shaft by a split ring keeper 31. The outer periphery of washer 29 seats against a shoulder 32 formed in main body 12 immediately rearward of a suitable lubricant seal assembly 33 for shaft 26.

The inner end of bore 25 is formed with a spherical socket 35 having an accurately finished smooth surface adapted to form a close running fit with the hub of the rotor assembly as will be explained presently. Lubrication of shaft 26 is accomplished by the aid of a grease cup assembly 37 having a threaded stem 38 (FIGURES 1 and 3) threaded into bore 39 opening through passage 40 into bore 25 in order that grease contained within the grease dispensing fitting 37 may be periodically forced into the shaft journal. This lubricant is held captive within the bearing by reason of seal 33 acting in cooperation with seal 29 for reasons evident from FIGURE 3.

Referring now to FIGURES 4 and 5, it is pointed out that the fluid displacement cavity is provided with a unitary rotor structure designated generally 43 having a spherical surfaced hub 44 having a close running fit with socket 35 in the main body. The mushroom-like main body portion of the rotor opposite hub 44 is formed with a spherical surface 45 preferably relieved throughout its midportion, as is indicated by the annular groove 46. It will be understood that groove 46 is not essential to the operation of the device but does serve to minimize frictional losses between rotor surface 45 and the juxtaposed interior surfaces of casing 11.

Rotor 43 is preferably formed in one piece from a suitable lightweight material having low surface friction, long-wearing qualities, as for example, bronze or a copper bearing alloy or a suitable plastic such as nylon. Such materials are easily and accurately machined and are immune to attack by many lubricants and numerous fluids likely to be encountered in the use of the device. Suitable plastics are moldable to precise shape without need for machining. Metal rotors are also ideally molded to shape by well known sintering techniques.

Rotor 43 is formed with a pair of diametric slots 47, 48 arranged at right angles to one another and passing through the rotor axis. The bottoms of these slots are coextensive with the spherical surface of hub 44 in a manner best illustrated in FIGURES 2 and 3. Hub 44 is formed with a non-circular bore 49 having an interior configuration and complemental to the non-circular contour of end 27 of driving shaft 26 to the end that the rotor may be telescoped over and away from shaft end 27. Accordingly, it is unnecessary to remove shaft 26 or to detach any holding devices or fasteners or any kind in attaching or detaching the rotor hub to the driving shaft.

Having a close sliding fit between the parallel side walls of slots 47, 48 are two sets of vanes 50, 51 featuring details best shown in FIGURES 4 and 5. The contours of the vane parts in each set differ from one another in particulars best shown in FIGURES 4 and 5 but the two main parts of each set are identical with one another according to a preferred design in order that the assembly of any two parts constitutes a vane set.

Referring to FIGURE 5 it is pointed out that identical parts 50a, 50a cooperate in the manner suggested in the drawings to provide a two-part segmental vane set 50 adapted to be assembled into receiving slot 48 of rotor 43. Likewise, it will be understood that vane set 51 comprises similarly shaped halves 51a of identical shape and contour adapted to be assembled into rotor slot 47. Owing to the diverse disposition and configuration of cut-out slots 50c and 51c of the two vane sets, set 51 is assembled into slot 47 first following which set 50 is assembled into slot 48. It is also pointed out that the small diameter spherical surfaces 50d and 51d have the same radius as spherical hub 44 of the rotor and bear directly against this surface. Moreover, the outer peripheral edges of each vane set are concentric with surfaces 50d, 51d.

An important feature of the vane sets is the provision in each of resilient spring means lying between the side faces of the vanes and effective to urge the parts of the vane sets away from one another circumferentially of hub 44. The normal relaxed shape of one preferred type of spring 53 is best shown in FIGURE 5. As will be apparent from that figure, the spring strip is generally J-shaped and has its curved end 54 anchored in a correspondingly shaped recess of the vane part with its bowed free leg resting along one end edge of a recess formed in the adjacent mating portions of the vane halves. Spring 53 is of light strength and the bowed portion of its free leg is pressed substantially straight when the two halves of a given vane set are initially assembled within casing 11.

It will therefore be recognized that springs 53 are effective to press the vane parts away from one another and in such manner as to urge the outer spherical surfaces of each into firm sealing contact with the interior of casing 11 and are equally effective in rotating the vane parts away from one another about spherical hub 44 thereby to press the radial edges 50e, 51e into firm sealing contact with flat surface 19 of the displacement cavity. It is pointed out that radial edge 50e of the vanes is of shallow V-shape as viewed from the end of the vanes and as is clearly illustrated in the drawings, particularly FIGURE 4. Likewise, spring 53 between the parts of vane set 51 perform identical functions with respect to those parts.

Another important feature of the invention resides in the fact that flat surface 19 of cavity end wall 18 is provided at its rim with an annular recess 55 against which flange 14 of casing 11 is clamped by screws 13. Annular side wall 56 (FIGURE 3) of recess 55 is concentric with the focal center of both surface 19 and of the fluid displacement chamber. The described structural features provide a simple, highly effective pilot for guiding the rim of casing 11 into assembled position and assure a snug fit of annular side wall 56 with the inner rim of casing 11 as well as the automatic and accurate centering of the casing with respect to socket 35 for rotor hub 44. Likewise, the accurate axial spacing between seating surface 55 and flat surface 19 of the displacement chamber provides a convenient and high precision mode of locating the diametric plane of the semi-spherical displacement cavity coincident with surface 19 of the main casing 18.

Additionally, the unavoidable radius existing between the junction of casing 11 with its mounting flange 14 is in this manner located well below surface 19 with the result that the junction of this surface with the interior spherical surface of casing 11 is sharp and truly annular. A suitable gasket, such as an O-ring 57, is located in an annular groove at the base of annular wall 56 and upon the tightening of cap screws 13, this seal assures a fluid-tight joint between the casing and main body 12.

Referring now to FIGURE 6, it is pointed out that this embodiment differs from that shown in FIGURES 1 to 5 only with respect to the shape of the ports 21', 22' at their points of merger with surface 19'. This shape is best described as dog-leg in shape and includes a large area end 21a and an associated small area end 21b merging at the bend of the dog-leg. The two portions preferably occupy a 90 degree arc or a full quadrant of surface 19'. Of importance is the fact that the inner radial edge of portion 21a lies close to but radially spaced from socket 35'; whereas, the outer radial edge of smaller portion 21b lies close to but spaced from side wall 56' defining the peripheral edge of surface 19'. It is also pointed out that the port end of passage 22' is preferably similarly shaped and disposed. Also of importance is the fact that the larger ends of the port are located adjacent one another but spaced apart by a 90 degree arc, the same characteristics being likewise true of the smaller end areas of these ports. Because of this disposition of the port, it will be understood that the rotor-vane assembly may be operated in either direction with equal efficiency and effectiveness.

The peculiar dog-leg contours of ports 21', 22' is of particular advantage when the device is being used to handle fluids conveying solids and semi-solids for reasons which will be understood from an analysis of the action taking place in the operation of the device. Let it be assumed that the rotor-vane assembly (identical with that shown in FIGURES 1 to 4) is present on end 27' of shaft 26' as viewed in FIGURE 6 and is being rotated clockwise. The inflowing fluid enters the displacement chamber through the larger end of passage 21' formed between flat surface 19 and the conically shaped rear face 60 of rotor 43. All portions of conical face 60 are spaced a substantial distance from the flat end wall surface 19 as is clearly illustrated in the drawings and particularly FIGURES 2 and 3. This displacement chamber is divided into four quadrants by vane sets 50 and 51. Rotation of the rotor by shaft 26 enables the vanes to aid flow by entraining the liquid and throwing it forwardly to fill the cavity quickly. As the trailing vane of the quadrant being filled passes beyond the upper edge of the inlet port, no further fluid can enter the quadrant nor can liquid back-flow toward the inlet passage because of the sealing action of the trailing vane just referred to.

At that time, it will be understood that the leading vane of the quadrant filled with liquid is ready to pass clockwise past the upper end of outlet passage 22'. Further advance of the rotor opens the filled quadrant into the large area end of outlet passage 22'. The large quantity of entering fluid is thrown downwardly and outwardly by the advancing vane and particles therein heavier than the fluid tend to follow a volute path and to exit through the auspiciously disposed narrow end of port 22'.

Owing to the particular disposition of the odd-shaped dog-leg flow ports 21', 22', it will be appreciated that it is immaterial in which direction shaft 26' is rotated. If it were known that the shaft would always be rotated in the same direction, it would be desirable to reverse the position of one of the ports so that their small and large area ends would alternate with one another rather than being disposed adjacent one another circumferentially of surface 19' as now illustrated in FIGURE 6.

In the manner just described it will be understood that the port design shown in FIGURE 6 is of unusual effectiveness and efficiency in the handling of solid and semi-solid matter present in the main body of fluid being handled. Likewise, it is pointed out that the spacing of the port edges inwardly of the rims of socket 35' and of outer wall 56' assures that both ends of the blade edge in contact with surface 19' are supported at all times, a feature of very considerable importance as respects the long service life and uniform wear of the vane edges.

Referring now to still another preferred embodiment of the invention illustrated in FIGURES 7 to 9, the same or similar parts to those of the first described embodiment are designated by similar reference characters but distinguished by the application of a double prime or other appropriate distinguishing symbol. The main body 12" of the device is identical with that described above in connection with FIGURES 1 to 5, the differences in construction being confined to design details of rotor unit 43" and to vane sets 50", 51".

Rotor 43" differs in that the diametric vane seating slots 47", 48" have their arcuate inner or bottom ends extending a slight distance below the spherical surface of rotor hub 44". In other words, referring to FIGURE 9, it is pointed out that rotor 44" is formed with shallow grooves 48a, 48a which open into and merge with slot 48". Similarly, the hub is formed with shallow grooves 47a, 47a not actually illustrated in the drawing but understood as underlying and merging with the inner end of slot 47" and identical with shallow grooves 48a. Likewise, the two parts of the vane sets 50", 51" have their inner arcuate surfaces 50"d, 51"d seated in these grooves and form close fitting fluid seal with the side walls of grooves 48a and 47a, respectively.

Seated in and movable along grooves 47a, 48a are short arcuate extensions 51f, 50f formed integrally with the parts of vane sets 50", 51". The operating relationship of these extensions with respect to surface 19" of the cavity end wall 18" will be best understood by reference to FIGURE 9. Thus, in all operating and rotary positions of the two vane sets, extensions 50f, 51f project inwardly beyond surface 19" and serve to prevent fluid from bypassing the vanes and flowing from one displacement quadrant to another by way of the grooves 47a, 48a.

Furthermore and of importance, grooves 47a and 48a form close sliding fit with the adjacent side wall portions of the vane thereby permitting the vane to operate for a much longer period without likelihood of leakage past the rotor parts. Stated differently, it will be apparent that the outer peripheral edges of the vanes can be worn down in service to a considerable extent as they are continuously held pressed against the inner peripheral surface of casing 11" to prevent leakage past the inner edge of the vanes. Nor does such wear risk leakage between the inner arcuate edges of the vanes owing to the sealing action of the edges with the side walls of the shallow grooves 47a, 48a in hub 44".

Attention is also called to FIGURE 9 and the fact the conically-shaped rear surface 60" of rotor 43" is always spaced from the flat surface 19" of the displacement cavity. This is likewise true of the rotor in each of the other constructions. This feature of the design has numerous advantages discussed in some detail in the above-identified earlier filed co-pending application and avoids need for the high tolerance manufacturing specifications characteristic of the prior art designs wherein such a conical surface is relied upon to form a movable fluid seal with the flat surface of the displacement cavity.

It is also pointed out that the simpler vane design present in vane sets 50", 51" is a desirable feature of this embodiment. To be noted in particular is the fact that the identical halves of each vane set avoid the use of overlapping portions thereby simplifying the manufacture and molding of these vanes from materials likely to warp during molding or forming in other appropriate manner. The vane parts of each set are urged apart by a modified form of spring as, for example, a light coil spring 53" having its opposite ends seated in suitable recesses in the adjacent edges of the vane parts. These springs are held in assembled position by the side walls of the seating slots when the vane sets are seated therein.

The operation of all embodiments of the invention will be quite apparent from the foregoing detailed description of the components and their relationship to one another. In general, the functioning of the device and its numerous applications will be understood as generally similar to those described in extensive detail in my earlier filed co-pending application. Of importance is the fact that the highly effective sealing from one another of the displacement quadrants is obtained primarily by reason of the design of the vane parts and their close sealing contact with surface 19 with the interior of spherical casing 11 and with the side walls of the slots in the rotor and with the arcuate grooves formed in rotor hub 44. The springs pressing the vane parts away from one another, acting in concert with the centrifugal forces effective upon these parts, assures that both the radial surfaces of the vanes in contact with surface 19 and the spherical surface of the vanes in contact with casing 11 will be maintained at all times and in all operating positions of the device. And this is true irrespective of the position in which the pump may be mounted with respect to the horizontal while operating. Moreover, this highly effective seal is maintained throughout the long service life of the device by reason of the construction of the vane sets in separate parts so that each end of a vane set may move relative to the other for the purpose of compensating for wear, variations in manufacturing tolerances and other variables. These highly desired features are not available in any prior design of this general type.

Equally important is the fact that spherical casing 11 is easily and simply formed inexpensively from sheet stock and to close manufacturing tolerances. This casing is easily assembled and disassembled and serves as the means for locking the vanes apart as well as the rotor in its proper operating position. Removal of this casing provides immediate access to the vane rotor assembly which may be detached without the removal of fasteners and as a unit. In the alternative, the vane sets may be removed, inspected and serviced without need for removal of the rotor or disturbing its sealed operating condition with respect to socket 35.

The described device may be used with fluids with a wide range of characters and of either a liquid or gaseous nature, or a combination of the two. It may also be used with fluids containing variable quantities of foreign matter including large solid particles with minimum risk of damage to the parts.

While the particular fluid handling device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A fluid handling device comprising a main body having an annular flat-surfaced end wall provided with a spherical socket at its center and a concentric annular rim axially offset rearwardly from said annular flat surface, a semi-spherical casing having a flanged rim secured to the axially offset annular rim and cooperating with said flat-surfaced end wall to form a fluid displacement cavity, a driving shaft having its axis inclined to said end wall and an inner non-circular end extending into said socket, a rotor detachably telescoped over and about the inner end of said shaft and held assembled thereto independently of separate fastener means, said rotor having a spherical hub seated in said socket and a wide area spherical surface in a close running fit with the interior surface of said casing and a conical surface all portions of which are spaced a substantial distance from said flat-surfaced end wall, said rotor having a pair of transverse slots at right angles to one another, a pair of vanes located in each slot each formed in two identical halves disconnected and movable entirely independently of one another and including means for biasing the halves of each vane away from one another in the plane thereof and into wiping contact with the juxtaposed surfaces of said end wall and of said spherical casing, and fluid inlet and outlet ports opening into diametrically opposed quadrants of said displacement cavity, said inlet and outlet ports each extending through arcs of approximately 90 degrees and having the opposite extremities of one port spaced approximately 90 degrees from the extremities of the other port.

2. A fluid handling device as defined in claim 1 characterized in that the pair of vane halves in each slot of said rotor have complementally shaped parts disposed in side-by-side overlapping relation within a given slot with the rim edges thereof disposed to maintain wiping contact throughout a 180 degree arc with the interior surface of said casing in wiping contact with said flat-surfaced end wall notwithstanding relative adjustment of the vane halves to compensate for eccentricities, tolerance variations, wear and the like.

3. A fluid handling device as defined in claim 1 characterized in that said hub is formed with shallow radial grooves in alignment with the slots in said rotor, said vanes being flat and relatively thin and being formed with extensions confined to the plane of said vanes, said extensions being disposed in and having a close running fit with the opposed side walls of said grooves, the radial rim edges of said extensions also having wiping and sealing contact with the juxtaposed wall portions of said socket in all operating positions of said vanes.

4. In combination, a fluid handling device having a one-piece main body, said main body having a supporting base and an annular flat-surfaced end wall inclined to the vertical, a separable semi-spherical casing having a flanged rim cooperating with said flat-surfaced end wall to form a fluid handling cavity, said flat-surfaced end wall having a spherical-surfaced socket concentric of and opening therethrough, a bore extending horizontally through said main body and opening into said spherical-surfaced socket, a shaft journaled in said bore with one end terminating in said socket, a rotor detachably mounted on said one end of said shaft having a spherical surface in close running contact with the interior surface of said casing and having a generally conical surface with all portions facing but spaced a substantial distance from said flat-surfaced end wall, said rotor including an integral spherical-surfaced hub having a close running fit with said spherical-surfaced socket, said main body having an annular surface concentric of said bore and providing a seat for the flanged rim of said casing, a plurality of diametric axial slots at right angles to one another formed in said rotor each movably supporting therein flat vane means each formed in two halves with each half free to move in any direction in the plane of said vane means, means resiliently urging said vane halves into contact with all juxtaposed portions of both said spherical casing and of said flat-surfaced end wall, and a pair of fluid passages formed in said main body on diametrically opposed sides of said shaft bore, said passages opening through said flat end wall in large area ports each extending through an arc of approximately 90 degrees circumferentially but not in excess of 90 degrees of said end wall in diametrically opposed quadrants of said flat-surfaced end wall and one being a fluid inlet passage and the other a fluid outlet passage, said ports each occupying the major portion of separate quadrants of said flat-surfaced end wall.

5. A one-piece main body as defined in claim 4 characterized in that said ports are dog-leg shaped with one end of each leg lying close to said socket and with the other end of each lying close to said shoulder.

6. A one-piece main body as defined in claim 5 characterized in that one end of each port is relatively large with respect to the other end.

7. A one-piece main body as defined in claim 6 characterized in that said relatively large ends of said ports are spaced apart approximately 90 degrees circumferentially of said end wall.

References Cited in the file of this patent

UNITED STATES PATENTS

| | | |
|---|---|---|
| 563,814 | Steinkoenig | July 14, 1896 |
| 1,142,544 | Vernon and Sieffert | June 8, 1915 |
| 1,191,189 | Kestel | July 18, 1916 |
| 1,392,390 | Anderson | Oct. 4, 1921 |
| 1,992,374 | Kempthorne | Feb. 26, 1935 |
| 2,037,894 | Grisell | Apr. 21, 1936 |
| 2,467,524 | Fernstrum | Apr. 19, 1949 |
| 2,493,478 | Dinesen et al. | Jan. 3, 1950 |
| 2,521,595 | Miller | Sept. 5, 1950 |
| 2,619,040 | Maisch | Nov. 25, 1952 |
| 2,653,551 | Rosaen | Sept. 29, 1953 |
| 2,681,046 | Barrett | June 15, 1954 |
| 2,708,413 | Loewen | May 17, 1955 |
| 2,946,290 | Sylvander | July 26, 1960 |

FOREIGN PATENTS

| | | |
|---|---|---|
| 227,342 | Great Britain | Jan. 15, 1925 |
| 374,153 | France | June 6, 1907 |
| 753,044 | Great Britain | July 18, 1956 |